(12) United States Patent
Oh

(10) Patent No.: US 9,718,076 B2
(45) Date of Patent: Aug. 1, 2017

(54) SPRINKLER SIDE FRAME COUPLING DEVICE

(71) Applicant: Kofulso Co., Ltd., Incheon-si (KR)

(72) Inventor: Seung-il Oh, Seoul (KR)

(73) Assignee: KOPULSO CO. LTD., Incheon-si (KR)

( * ) Notice: Subject to any disclaimer, the term of this patent is extended or adjusted under 35 U.S.C. 154(b) by 274 days.

(21) Appl. No.: 14/608,722

(22) Filed: Jan. 29, 2015

(65) Prior Publication Data

US 2016/0221018 A1    Aug. 4, 2016

(51) Int. Cl.
| | | |
|---|---|---|
| *F16B 2/10* | (2006.01) | |
| *F16L 3/24* | (2006.01) | |
| *B05B 15/06* | (2006.01) | |
| *A62C 35/68* | (2006.01) | |

(52) U.S. Cl.
CPC ............ *B05B 15/061* (2013.01); *A62C 35/68* (2013.01); *F16B 2/10* (2013.01); *F16L 3/24* (2013.01); *Y10T 403/595* (2015.01); *Y10T 403/599* (2015.01); *Y10T 403/602* (2015.01)

(58) Field of Classification Search
CPC ......... A62C 35/68; B05B 15/061; F16B 2/10; F16C 11/103; F16L 3/24; Y10T 403/59; Y10T 403/595; Y10T 403/599; Y10T 403/60; Y10T 403/602; Y10T 403/608
USPC ....................... 403/321, 322.4, 325–327, 330
See application file for complete search history.

(56) References Cited

U.S. PATENT DOCUMENTS

| | | | |
|---|---|---|---|
| 2,375,513 | A | 5/1945 | Bach |
| 3,341,909 | A | 9/1967 | Havener |
| 3,556,452 | A | 1/1971 | Ramsey |
| 3,558,091 | A | 1/1971 | Bush |
| 3,608,857 | A | 9/1971 | Hibbeler |
| 3,612,461 | A | 10/1971 | Brown |
| 3,652,780 | A | 3/1972 | Wilson |
| 3,874,035 | A | 4/1975 | Schuplin |
| 4,135,692 | A | 1/1979 | Ferguson |
| 4,149,693 | A | 4/1979 | LoNigro |
| 4,408,428 | A | 10/1983 | Brooke et al. |
| 4,544,119 | A | 10/1985 | Kellett et al. |
| 4,717,099 | A | 1/1988 | Hubbard |
| 4,723,749 | A | 2/1988 | Carraro et al. |
| 5,595,363 | A | 1/1997 | DeLeeBeeck |
| 5,667,181 | A | 9/1997 | van Leeuwen et al. |
| 6,260,810 | B1 | 7/2001 | Choi |
| 6,341,466 | B1 | 1/2002 | Kehoe et al. |
| 6,345,800 | B1 | 2/2002 | Herst et al. |
| 6,554,231 | B2 | 4/2003 | Choi |
| 6,811,130 | B1 | 11/2004 | Oh |
| 7,032,690 | B2 | 4/2006 | Ramey et al. |
| 7,255,315 | B2 | 8/2007 | Oh |

(Continued)

*Primary Examiner* — Josh Skroupa

(74) *Attorney, Agent, or Firm* — Jacobson Holman, PLLC.

(57) ABSTRACT

A sprinkler side frame coupling device including: a side frame coupled to support frames each having a locking step formed on top thereof and having a body, first bending portions formed on both sides of the body, a horizontal portion formed from each first bending portion, a second bending portion, a space portion formed on each first bending portion, pin support portions, long holes formed on the pin support portions, shaft support portions, and inclined projection portions; a locking pin having a shape of 'U' fitted to the long holes; and coupling members each having a plurality of inclined teeth.

2 Claims, 4 Drawing Sheets

(56) References Cited

U.S. PATENT DOCUMENTS

| | | | | |
|---|---|---|---|---|
| 7,264,214 B2* | 9/2007 | Oh | ............ | A62C 35/68 |
| | | | | 169/16 |
| 7,427,051 B2* | 9/2008 | Oh | ............ | F16L 3/24 |
| | | | | 248/72 |
| 7,506,845 B2* | 3/2009 | Oh | ............ | F16L 3/24 |
| | | | | 248/72 |
| 8,109,482 B2* | 2/2012 | Oh | ............ | A62C 35/68 |
| | | | | 248/342 |
| 8,413,734 B2* | 4/2013 | Silcox | ............ | A62C 35/68 |
| | | | | 169/16 |
| 8,474,199 B2* | 7/2013 | Oh | ............ | A62C 35/68 |
| | | | | 248/343 |
| 8,500,079 B2* | 8/2013 | Oh | ............ | A62C 35/68 |
| | | | | 239/283 |
| 8,833,718 B2 | 9/2014 | Oh | | |
| 9,004,422 B2* | 4/2015 | Feenstra | ............ | A62C 35/68 |
| | | | | 248/200.1 |
| 9,174,077 B2* | 11/2015 | Lim | ............ | A62C 35/68 |

* cited by examiner

SPRINKLER SIDE FRAME COUPLING DEVICE

BACKGROUND OF THE INVENTION

Field of the Invention

The present invention relates to a sprinkler side frame coupling device that has coupling members disposed on both sides of a side frame, thus installing the side frame on support frames in rigid and convenient manners.

Background of the Related Art

Generally, support frames are disposed on a ceiling so as to install a variety of structures thereon, and a side frame is disposed on top of the support frames in a crossing direction to the support frames. The side frame has a reducer fixing bracket mounted thereon, and a reducer to which a sprinkler head is fitted is mounted on the reducer fixing bracket.

A conventional sprinkler side frame includes a square frame having a square section and brackets adapted to couple the square frame to support frames, but in this case, the square frame is coupled to the support frames by means of screws after the brackets have been coupled to the support frames, thus undesirably conducting the side frame installation in an inefficient manner.

So as to remove the above-mentioned problems, there has been proposed U.S. Pat. No. 7,255,315 disclosing side frame formed unitarily with bracket, which is issued to the same applicant, as the invention. In this prior art, coupling means, which is disposed on both side bending portions of the side frame in such a manner as to be coupled to support. frames, is made of an elastic member, thus making it easy to mount the side frame on the support frames, but if an external force is applied to the coupling means, the elastic members may be escaped from locking steps of the support frames.

Accordingly, this inventor has studied on a sprinkler side frame coupling device capable of easily coupling the site frame to the support frames, without fear of the deviation of the coupling means from the locking steps of the support frames due to the application of the external force, and as a result, a new sprinkler side frame coupling device has been developed and proposed.

SUMMARY OF THE INVENTION

Accordingly, the present invention has been made in view of the above-mentioned problems occurring in the prior art, and it is an object of the present invention to provide a sprinkler side frame coupling device that has coupling members having locking means disposed on both sides of a side frame, thus installing the side frame on support frames in rigid and convenient manners.

To accomplish the above-mentioned object, according to the present invention, there is provided a sprinkler side frame coupling device including: a side frame coupled to support frames each having a locking step formed on top thereof, the side frame having a body, first bending portions formed on both sides of the body, a horizontal portion formed from each first bending portion, a second bending portion bent vertically from the horizontal portion, a space portion formed on each first bending portion, pin support portions formed on both sides of the space portion, long holes formed on the pin support portions, shaft support portions protruding upwardly from the horizontal portion, and inclined projection portions formed on the second bending portion in such a manner as to be locked onto the underside end of the locking projection; a locking pin having a shape of 'U' fitted to the long holes; and coupling members each having a plurality of inclined teeth formed at a position pushing one side of the locking pin, in the state of being rotatably coupled to the shaft support portion around a shaft, and locking projections formed on the lower portion thereof to allow the outer side of the locking step to be locked thereonto.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a sprinkler side frame coupling device according to the present invention will be in detail given with reference to the attached drawing.

Figure 1:
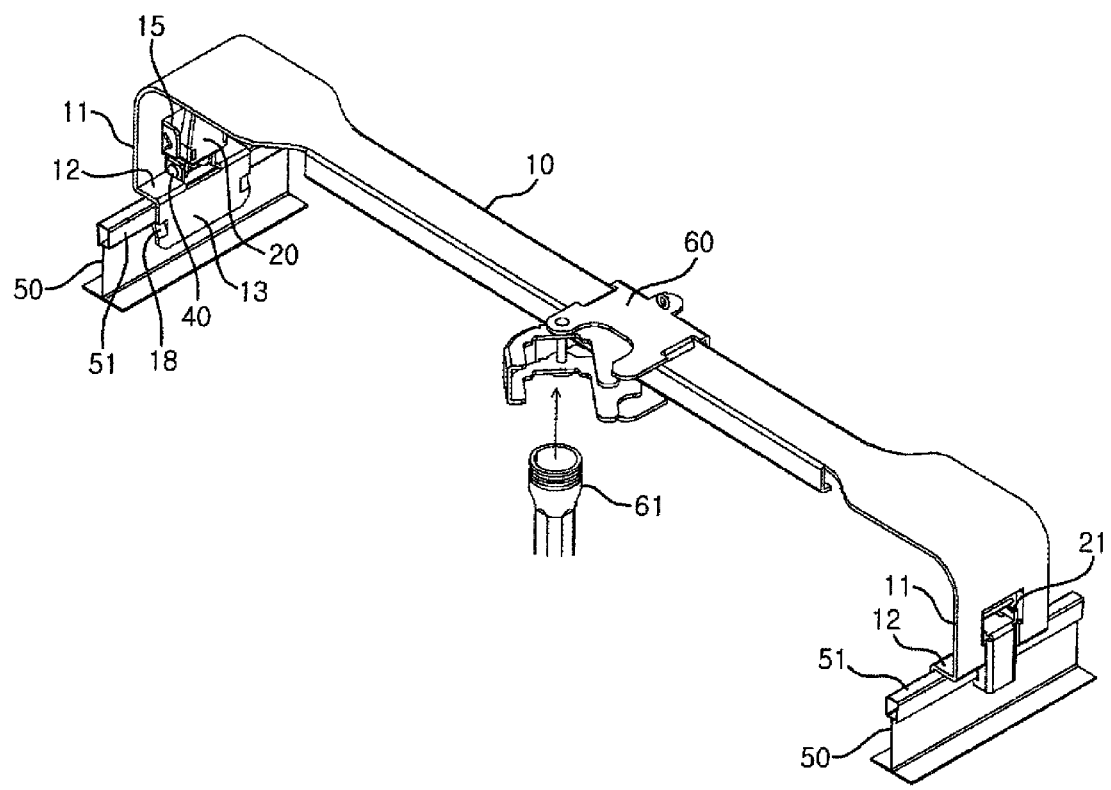
FIG. 1 is a perspective view showing a sprinkler side frame coupling device according to the present invention.

As shown in FIG. 1, a sprinkler side frame coupling device according to the present invention is provided with a side frame mounted on top of support frames each having a locking step 51, and a sprinkler head 61 is mounted on a center bracket 60 mounted on the side frame. Further, coupling members 20 and locking pins 30 are mounted on both sides of the side frame.

Figure 2:
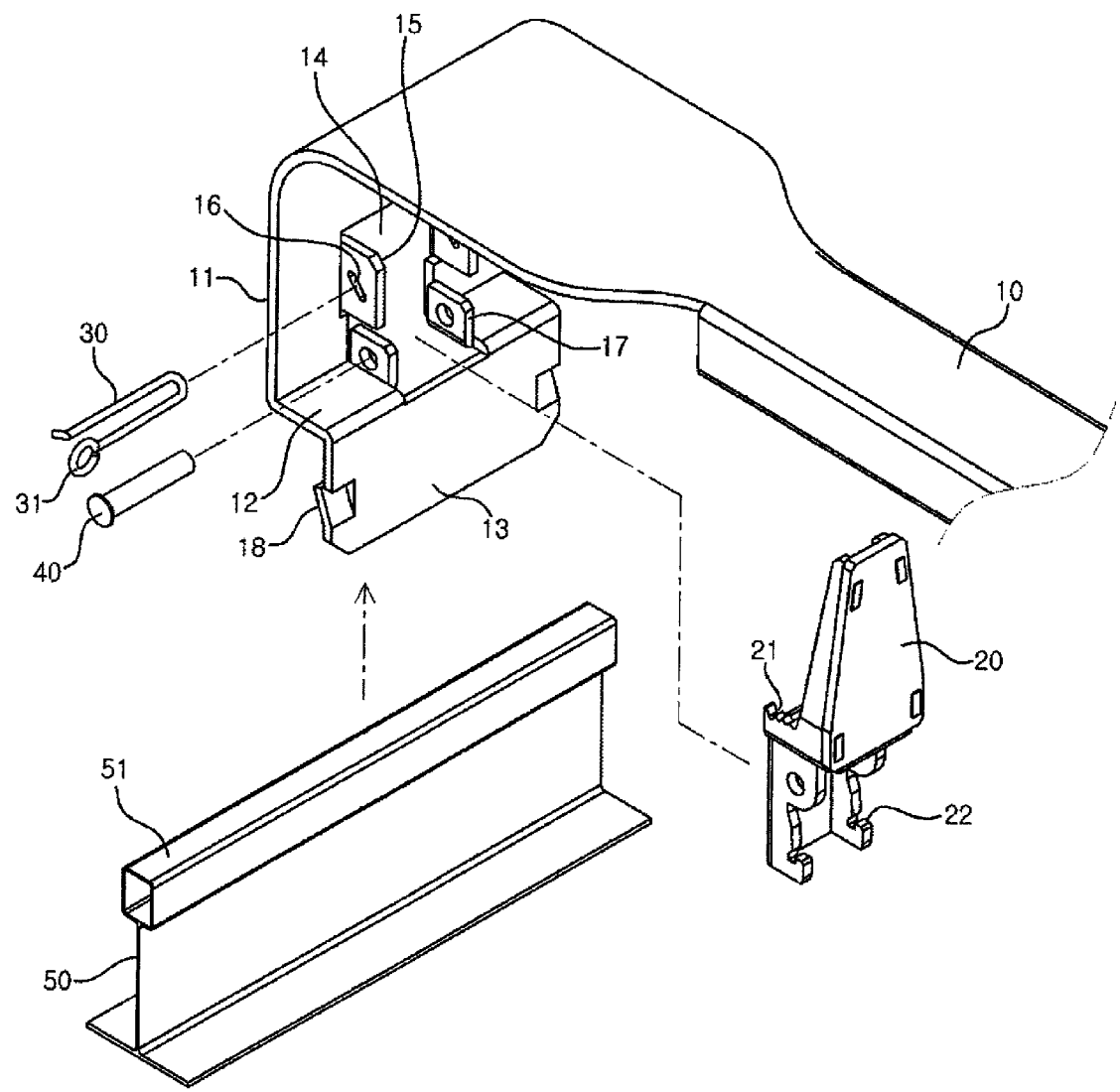
FIG. 2 is an exploded perspective view showing the main parts of the sprinkler side frame coupling device according to the present invention.

As shown in FIG. 2, the side frame includes first bending portions 11 formed on both sides of a frame body 10, a horizontal portion 12 formed from each first bending portion 11, a second bending portion 13 bent vertically from the horizontal portion 12, a space portion 14 formed on each first bending portion 11, pin support portions 15 formed on both sides of the space portion 14, long holes 16 formed on the pin support portions 15, shaft support portions 17 protruding upwardly from the horizontal portion 12, and inclined projection portions 18 formed on the second bending portion 13 in such a manner as to be locked onto the underside end of the locking step 51.

The inclined projection portions 18 are formed inclinedly from incised portions of the second bending portion 13 and pressedly fitted to the locking step 51 by means of elastic forces thereof.

The locking pin 30 having a shape of 'U' fitted to the long holes 16. The locking pin 30 has a loop portion 31 formed on one side thereof in such a manner as to be protruded from one side pin support portion 15, so that the loop portion 31 pushes to allow one side portion of the locking pin 30 to move backwardly.

Each coupling member 20 has a plurality of inclined teeth 23 formed at a position pushing one side of the locking pin 40, in the state of being rotatably coupled to the shaft support portion 17 around a shaft 40, and locking projections 22 formed on the lower portion thereof to allow the outer side of the locking step 51 to be locked there onto.

The space portion 14 is a portion wherein the coupling member 20 is turned without having any interference.

Figure 3:
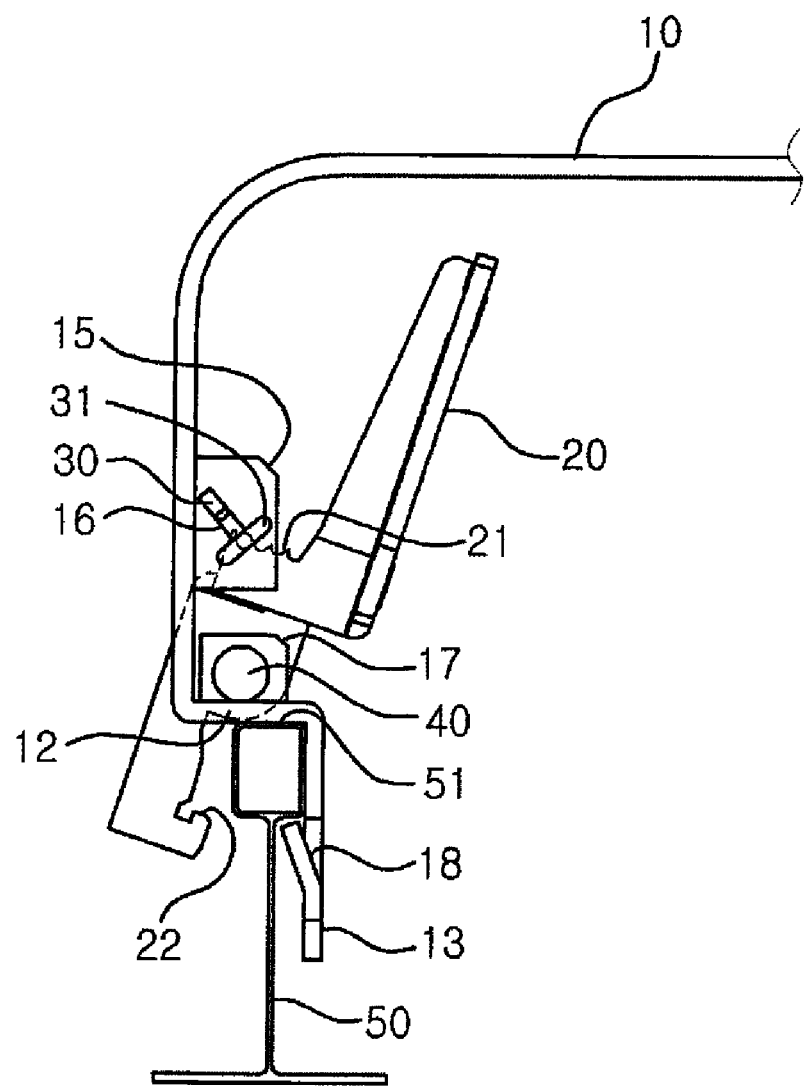
FIG. 3 is a side sectional view showing the state wherein a coupling member of the sprinkler side frame coupling device is fitted to a support frame.

As shown in FIG. 3, in the state where the coupling member 20 is inclinedly located with respect to the first bending portion 11 to allow the locking projections 22 to be open, the locking step 51 is fitted between the locking projections 22 and the second bending portion 13. At this time, the inclined projection portions 18 are locked onto the underside of the inner side of the locking step 51.

Figure 4:
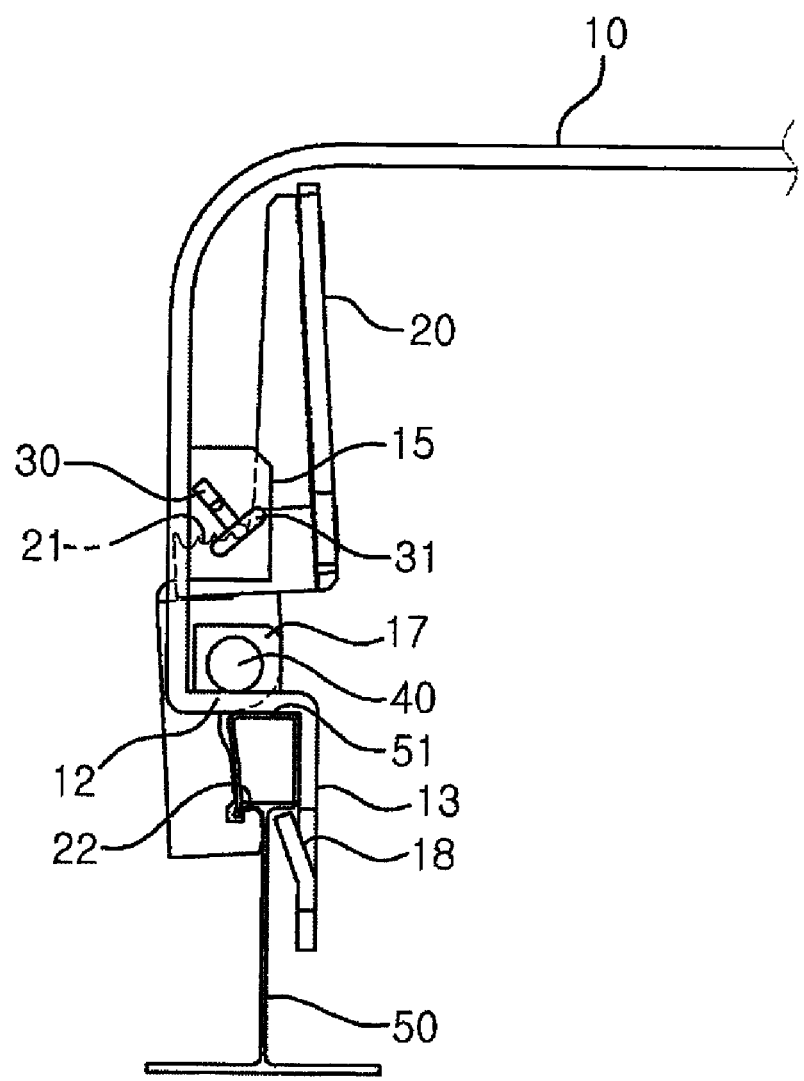
FIG. 4 is a side sectional view showing the state wherein the coupling member of the sprinkler side frame coupling device is turned to a locking position.

If the coupling member 20 pushes in this state, as shown in FIG. 4, the locking projections 22 are locked onto the underside of the outer side of the locking step 51. That is, when the coupling member 20 is turned, the inclined surfaces of the inclined teeth 21 slidingly push one side of the locking pin 30. If the locking projections 22 are locked onto the underside of the outer side of the locking step 51, the locking pin 30 is fitted to the inclined teeth 21 to a locking position, thus fixing the coupling member 20 to the locking position.

That is, the support frame 50 is coupled to the body 10 of the side frame in the state where the underside of the locking step 51 is locked onto the locking projections 22 and the inclined projection portions 18, and the locking pin 30 is locked onto the inclined teeth 21 to maintain the locking state of the coupling member 20.

On the other hand, if the loop portion 31 of the locking pin 30 pushes, one side of the locking pin 30 is deviated from the inclined teeth 21 to allow the locking projections 22 to be released from the locking step 51, thus conveniently disassembling the body 10 of the side frame from the support frame 50.

As described above, if the coupling member 20 presses in the state wherein the locking step 51 of the support frame 50 is fitted between the coupling member 20 and the second bending portion 13, the locking projections 22 are locked onto the locking step 51 to allow the coupling member 20 to be fixed by means of the locking pin 30, thus rigidly and conveniently coupling the side frame with the support frame 50.

While the present invention has been described with reference to the particular illustrative embodiments, it is not to be restricted by the embodiments but only by the appended claims. It is to he appreciated that those skilled in the art can change or modify the embodiments without departing from the scope and spirit of the present invention.

What is claimed is:

1. A sprinkler side frame coupling device comprising:
    a side frame coupled to support frames 50 each having a locking step 51 formed on to thereof, the side frame having a body 10, first bending portions 11 formed on both sides of the body 10, a horizontal portion 12 formed from each first bending portion 11, a second bending portion 13 bent vertically from the horizontal portion 12, a space portion 14 formed on each first bending portion 11, pin support portions 15 formed on both sides of the space portion 14, long holes 16 formed on the pin support portions 15, shaft support portions 17 protruding upwardly from the horizontal portion 12, and inclined projection portions 18 formed on the second bending portion 13 in such a manner as to be locked onto the underside end of the locking step 51;
    a locking pin 30 having a shape of 'U' fitted to the long holes 16; and
    coupling members 20 each having a plurality of inclined teeth 23 formed at a position pushing one side of the locking pin 40, in the state of being rotatably coupled to the shaft support portion 17 around a shaft 40, and locking projections 22 formed on the lower portion thereof to allow the outer side of the locking step 51 to be locked thereonto.

2. The sprinkler side frame coupling device according to claim 1, wherein the locking pin 30 has a loop portion 31 formed on one side thereof.

* * * * *